United States Patent
Koseki et al.

(10) Patent No.: US 8,713,251 B2
(45) Date of Patent: Apr. 29, 2014

(54) STORAGE SYSTEM, CONTROL METHOD THEREFOR, AND PROGRAM

(75) Inventors: Hideyuki Koseki, Machida (JP); Yusuke Nonaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 879 days.

(21) Appl. No.: 12/527,653

(22) PCT Filed: May 27, 2009

(86) PCT No.: PCT/JP2009/002325
§ 371 (c)(1),
(2), (4) Date: Aug. 18, 2009

(87) PCT Pub. No.: WO2010/137067
PCT Pub. Date: Dec. 2, 2010

(65) Prior Publication Data
US 2011/0289280 A1    Nov. 24, 2011

(51) Int. Cl.
*G06F 12/00* (2006.01)
*G06F 12/08* (2006.01)

(52) U.S. Cl.
CPC ........ *G06F 12/0808* (2013.01); *G06F 12/0866* (2013.01)
USPC .... 711/112; 711/113; 711/114; 711/E12.026; 711/E12.037

(58) Field of Classification Search
CPC .......................... G06F 12/0808; G06F 12/0815
See application file for complete search history.

(56) References Cited

U.S. PATENT DOCUMENTS

| 5,504,858 A * | 4/1996 | Ellis et al. ..................... 714/6.24 |
| 6,983,349 B2 | 1/2006 | Okumoto et al. |
| 2005/0005191 A1 | 1/2005 | Judd |
| 2005/0066230 A1 | 3/2005 | Bean et al. |
| 2006/0047872 A1 | 3/2006 | Nakagawa et al. |

FOREIGN PATENT DOCUMENTS

| JP | 2001-202295 A | 7/2001 |
| JP | 2003-323263 A | 11/2003 |

\* cited by examiner

*Primary Examiner* — Reginald Bragdon
*Assistant Examiner* — Thanh D Vo
(74) *Attorney, Agent, or Firm* — Foley & Lardner LLP

(57) ABSTRACT

A disk array device that can detect the successful completion of data overwrite/update at high speed only by checking a UDT is provided. When a DIF is used as a verification code appended to data, check information that detects the successful completion of overwrite is defined in the UDT, in addition to address information that detects positional errors. Upon request of overwrite/update of data stored in a cache, a check bit of the data in the cache is changed to a value different from a check bit to be appended to new data by a host adapter. Then, data transfer is initiated. Upon completion of the data overwrite, the check bit is changed back to the original value, whereby it is possible to detect the successful completion of overwrite/update (FIG. 8).

11 Claims, 16 Drawing Sheets

| LUN | LU size | Disk No. | START LBA | LAST LBA |
|---|---|---|---|---|
| 0 | 20GB | 0-1 | 0 | 113548 |
| | | 0-2 | 0 | 113548 |
| | | 1-1 | 1000 | 114548 |
| | | 3-8 | 312456 | 426004 |
| 1 | 10GB | 4-0 | 0 | 74298 |
| | | 4-1 | 0 | 74298 |
| | | 4-2 | 0 | 74298 |
| ... | ... | ... | ... | ... |

| Segment No. | LUN | LBA | LENGTH |
|---|---|---|---|
| 162310 | 162320 | 162330 | 162340 |
| 0 | 11 | 19389 | 32 |
| 1 | 3 | 78574985 | 8 |
| 2 | 43 | 553460 | 16 |
| ... | ... | ... | ... |
| N | N | N | N |

| List No. | Transfer Direction | Segment No. | LENGTH | Check Bit | LUN | LBA | Mode |
|---|---|---|---|---|---|---|---|
| 162410 | 162420 | 162430 | 162440 | 162450 | 162460 | 162470 | 162480 |
| 1 | WR | 100 | 8 | 0 | 10 | 200 | Append |

| List No. | Segment No. | Check Bit | LUN | LBA | result |
|---|---|---|---|---|---|
| 1 | 100 | 1 | 10 | 200 | OK |

FIG. 18

| List No. | Primary status | Primary update time | Secondary status | Secondary update time |
|---|---|---|---|---|
| 1 | N/A | N/A | N/A | N/A |

162610  162620  162630  162640  162650

16260

STORAGE SYSTEM, CONTROL METHOD THEREFOR, AND PROGRAM

TECHNICAL FIELD

The present invention relates to a storage system, a control method therefor and a program, and for example relates to a technique of verifying the successful writing in a storage system (a disk array system) when the storage system receives data from a host that is a higher-level device of the system (hereinafter referred to as data writing).

BACKGROUND ART

Disk array devices, when configured to constitute RAID (Redundant Array of Independent (or Inexpensive) Disks), enable parallel operation of multiple disks and thus realize data reading and data writing requested by a host at high speed. In such disk array devices, redundant data corresponding to an RAID level such as Mirror or Parity is created in order to provide high fault tolerance to protect against disk failure.

Further, in the disk array devices, a verification code for detecting data corruption and errors in a destination address that could occur during transfer is appended to received data for the purpose of improving the reliability of the whole system. For example, in data writing, data received from a host is divided into logical data blocks each having a constant data length, and a verification code is appended to each logical data block, so that the logical data having the verification code appended thereto is stored in a cache memory or a disk. After that, when data reading is requested by the host, a verification code of the relevant data is checked before the data is transferred to the host, whereby it is ensured that the data to be transferred to the host is identical to the data that has been written.

As a specific example of such verification codes, a technique of appending an LRC (Longitudinal Redundancy Check) code for detecting data bit errors that could occur during transfer and also appending an LA (Logical Address) for detecting address errors is typically known (see Patent Literature 1). In recent years, a DIF (Data Integrity Field) proposed by T10, which is a storage interfaces technical committee, has been spreading as a standard format of a verification code.

There are also cases in which an interface device that supports the process of creating/appending and checking/deleting such a verification code is used as a host adapter of a disk array device. In such cases, in data writing, a disk adapter, which is an entrance of a disk array device, appends a verification code to data received from a host. Meanwhile, in data reading, the disk adapter checks for the integrity of the verification code. Accordingly, it is possible to ensure that a data error or data loss has not occurred in the device.

CITATION LIST

Patent Literature

PTL 1: JP Patent Publication (Kokai) No. 2001-202295 A
PTL 2: JP Patent Publication (Kokai) No. 2003-323263 A

SUMMARY OF INVENTION

Technical Problem

A disk array device such as the one illustrated in Patent Literature 1 checks for the presence or absence of data errors (such as data corruption or data loss) with the use of a verification code in data reading. However, in such a technique, whether or not data has been accurately written to a cache memory in data writing is not ensured. Typical disk array devices have a high-speed, low-capacity cache memory in order to improve the I/O (Input/Output) processing performance, and an asynchronous writing process is performed in data writing. In this process, upon storage of data transferred from a host into a cache memory, the host is notified of the completion of data transfer, and thereafter, the data in the cache memory is written to a disk device at a given timing.

Therefore, in the disk array device such as the one disclosed in Patent Literature 1, there is a possibility that the session of the data transfer from the host could be closed without the data accurately written to a cache memory due to a transfer error that occurs during data writing. That is, the host could erroneously determine that data transfer has ended normally upon reception of the information about the completion of data transfer from the disk array device, and thus could close the transfer session. After that, even if the disk array device detects errors in the data in the cache memory, it would be impossible to issue a data retransmission request to the host. Accordingly, data loss could occur in which the disk array device loses the received data.

Accordingly, in order to ensure that data has been accurately stored in a cache memory, it is necessary to check a verification code of data stored in the cache memory so as to check for the presence or absence of transfer errors before notifying the host of the completion of data transfer.

The present invention has been made in view of the foregoing, and it is an object of the present invention to provide a technique of preventing the occurrence of data loss by ensuring that data has been accurately written to a cache memory.

Solution to Problem

In the present invention, a method of checking the address portion of a verification code is used as a means of ensuring the successful data transfer to a cache memory. It should be noted that, however, that when only the address portion is checked, it would be impossible to detect if data in the cache has been accurately updated/overwritten. This is because, the address portion will not change either before or after the overwrite, and thus the check result of the address portion will be always the same whenever it is checked.

Thus, according to the present invention, a check bit for verifying the successful update/overwrite is also provided in a verification code, and both the address information and the check bit are checked so as to verify the successful overwrite.

First, in overwriting, a check bit of a verification code appended to data to be overwritten, which is in a cache memory, is set to "1" indicative of non-updated data, before the initiation of data transfer from a host. Then, a data transfer request is issued to the host and a host adapter is instructed to assign "0," indicative of updated data, to a check bit of a verification code appended to data transferred from the host. Since a verification code with a check bit of "0" indicative of updated data is appended to the data transferred from the host adapter to the cache memory, if the data in the cache memory is accurately updated, the check bit that has been preset to "1" should be updated to "0". Therefore, after the completion of data transfer to the cache memory, it is possible to determine if there is any address error and if the data has been surely updated by checking only the address portion and the check bit of the verification code appended to the updated data.

That is, a disk array device of the present invention includes a memory (160), a transfer processor (110), and a memory controller (150). In the memory (160), old data (301) to be updated is stored that has a verification code (310) including a positional information (342, 351) of the data in a disk unit (200) and a check information (341) for ensuring the successful writing. The memory controller (150), upon receiving a write request of new data (302) for updating the old data (301) from an external device (40), changes the check information (341) of the old data (301) to an information different from a check information (341) to be appended to the new data (302), and then instructs the external device (40) to initiate transfer of the new data (302). The transfer processor (110) appends a verification code (310), which includes a positional information (342, 351) and a check information (341) for ensuring the successful writing, to the new data (302) received from the external device (40), and transfers the new data with the verification code appended thereto to the memory (160). Accordingly, when the new data (302) has been accurately written to the memory (160), the check information (341) that has been changed is changed back to the original check information (341). Note that the memory controller (150) references information that specifies the old data (301) included in the write request, and checks if the old data (301) to be updated is present in the memory (160). If it is determined to be present in the memory (160), the memory controller (150) changes the check information (341) of the old data (301).

In addition, the transfer processor (110) sends information about the completion of the writing of the new data (302) to the memory (160) from the memory controller (150) to the external device (40).

The transfer processor (110) may be configured to create multiple data blocks (300) by dividing the new data (302) into multiple groups each having a predetermined length (for example, 512 bytes) and append the verification code (310) to each data block (300). In that case, the memory controller (150) is configured to write the new data (302) to the memory (160) per data block (300) and change the check information (341) that has been changed back to the original check information (341).

In addition, the memory controller (150) checks if the new data (302) is the right data by comparing the positional information (342, 351) of the verification code (310) appended to the new data (302) with the setting information (16240) indicating a position of the disk unit (200) to which the new data (302) should be written.

Further, when the verification code (310) includes a data error detection code (320) for detecting data errors, the memory controller (150) may be configured to compare information obtained by computing the new data (302) written to the memory (160) with the data error detection code (320), and if the two match, determine that the new data (302) has been successfully written to the memory (160).

Further features of the present invention will become apparent from the following description of embodiments and the accompanying drawings.

Advantageous Effects of Invention

According to the present invention, the possibility of data loss that could occur in a disk array device can be reduced, whereby the reliability of data in the disk array device can be improved.

Further, it is also possible to detect update/overwrite errors of data in a cache memory, which cannot be detected when only the address portion of the verification code is checked.

BRIEF DESCRIPTION OF DRAWINGS

FIG. 5 is a diagram illustrating an exemplary configuration of a memory management table.

FIG. 6 is a diagram illustrating an exemplary configuration of a transfer list.

FIG. 18 is a diagram illustrating an exemplary configuration of a status management table 16260.

DESCRIPTION OF EMBODIMENTS

Figure 1:
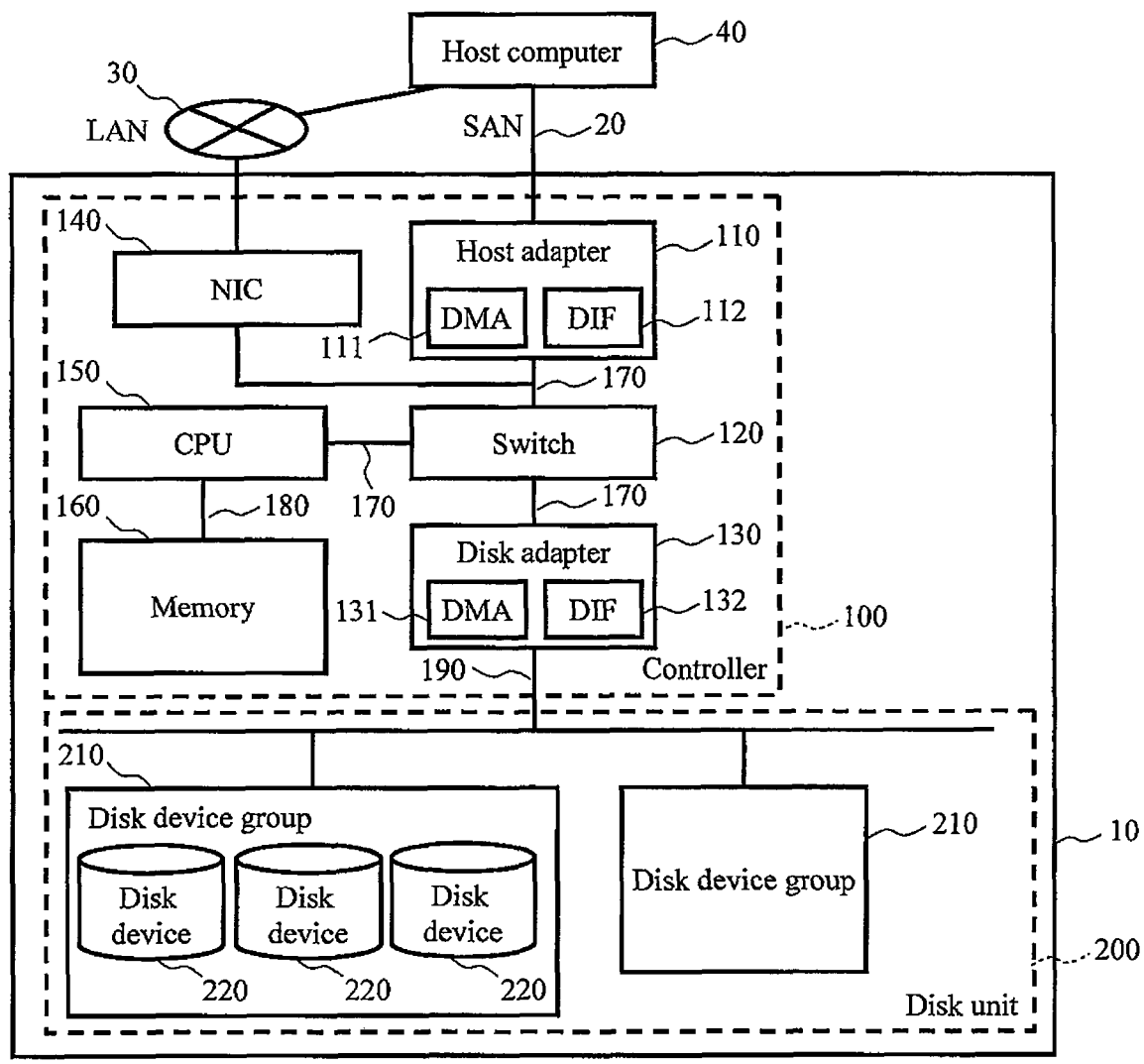
FIG. 1 is a diagram illustrating a schematic configuration of a disk array system according to the first embodiment of the present invention.

The present invention discloses a technique of ensuring that an overwrite save has been successfully completed when updating the old data in a memory (a cache memory) with new data.

Although embodiments of the present invention will be hereinafter described with reference to the accompanying drawings, it should be appreciated that such embodiments are illustrative only to carry out the present invention and are not intended to limit the technical scope of the present invention. In addition, structures that are common to all of the drawings are denoted by common reference numerals. It should also be noted that although the present invention is based on the premise that a DIF is used as a data verification code, other types of formats can also be used.

(1) FIRST EMBODIMENT

System Configuration

FIG. 1 is a block diagram illustrating a schematic configuration of a disk array system (storage system) according to the first embodiment of the present invention. The disk array system includes a disk array device (a storage device) 10 and a host computer 40.

In FIG. 1, the disk array device 10 includes a controller 100 for controlling the entire disk array device 10 and a disk unit 200 in which data is stored.

The disk array device 10 is connected to the host computer (a higher-level device (e.g., an application server) that utilizes the disk array device 10) 40 via a host adapter 110 of the controller 100. As an interface for connecting the disk array device 10 and the host computer 40, a SAN (Storage Area Network) 20 corresponding to the SCSI protocol used for data transfer is used, for example. For construction of the SAN 20, it is possible to use Fibre Channel, SCSI (Small Computer System Interface), iSCSI (internet Small Computer System Interface), USB (Universal Serial Bus), or IEEE 1394 bus, for example.

The number of the host computers 40 connected to the disk array device 10 can be more than one. In addition, other kinds of interfaces can be used instead of the SAN 20.

Control software for controlling the operation of the disk array device 10 is installed on the host computer 40. With the control software executed by the host computer 40, commands and the like for the disk array device 10 are issued, whereby the operation of the disk array device 10 can be controlled. It should be noted that, since the disk array device 10 communicates with the control software executed by the host computer 40 over, for example, a LAN (Local Area Network) 30, the controller 100 includes a NIC (Network Interface Card) 140 that is an interface for connecting the disk array device 10 and the LAN 30. The disk array device 10 can be managed, controlled, or maintained by a computer different from the host computer 40. In addition, other types of communications networks can be used instead of the LAN 30.

The controller 100 includes the host adapter 110 that is connected to and communicates with the host computer 40, a disk adapter 130 serving as an interface for enabling mutual communication between the controller 100 and the disk unit 200, the NIC 140 that is an interface for connection to the LAN 30, a CPU (Central Processing Unit) 150 for controlling the entire disk array device 10, and a switch 120. The CPU 150, the host adapter 110, and the disk adapter 130 are connected via the switch 120. Communication between each device is performed via internal buses 170 such as PCI (Peripheral Component Interconnect). The switch 120 can be replaced by an IOH (I/O HUB).

The controller 100 includes a memory 160 in which computer programs and data necessary for the CPU 150 to control the disk array device 10 are stored. The CPU 150 and the memory 160 are connected via a dedicated bus 180 such as DDR3 (Double Data Rate 3). Further, the memory 160 of the present invention also has a function of a cache memory that temporarily stores data communicated between the host computer 40 and the disk unit 200.

The host adapter 110 has a DMA (Direct Memory Access) transfer function 111. The host adapter 110 transfers data in accordance with a transfer list that is set within the memory 160 by the CPU 150. In addition, the host adapter 110 has a DIF creating/checking function 112. That is, in data writing, the host adapter 110 can append a DIF that is a data verification code to data received from the host computer 40, whereas in data reading, the host adapter 110 can check for alteration of data in the disk array device 10 by comparing a code obtained by computing data transferred from the memory 160 with a verification code appended thereto. If the two codes are found to match, it is ensured that the data has not been altered.

The disk adapter 130 has a DMA function 131 and a DIF function 132 similarly to the host adapter 110, and thus, it can detect transfer errors that could occur during data transfer between the memory 160 and the disk device 210.

The disk unit 200 includes multiple disk device groups 210. Further, each of the disk device groups 210 includes multiple disk devices 220, and two or more disk devices 220 among the multiple disk devices 220 constitute an RAID group. The disk devices 220 are, for example, hard disk drives (HDD), though other types of physical disk drives such as DVD (Digital Versatile Disk) drives can also be used. Instead of such physical disk drives, it is also possible to use other types of physical storage devices such as semiconductor memory drives (for example, flash memory drives). The disk device groups 210 and the disk adapter 130 are connected via a dedicated bus 190 such as Fibre Channel or SAS (Serial Attached SCSI).

<Configuration of DIF Format>

Figure 2:
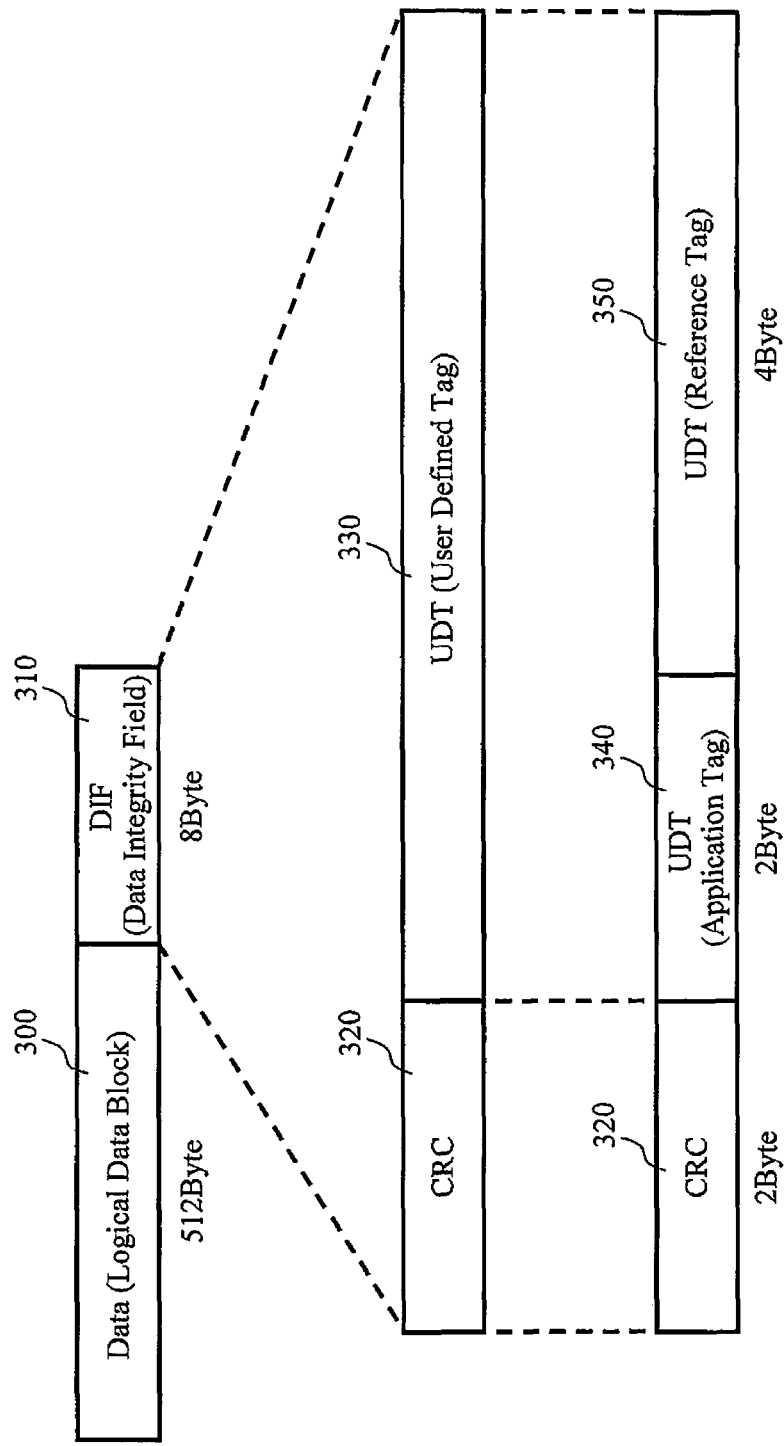
FIG. 2 is a schematic diagram of a DIF format.

FIG. 2 illustrates a schematic configuration of a DIF format. As illustrated in FIG. 2, when a DIF is used, data received from the host computer 40 is divided into 512-byte logical data blocks 300. An 8-byte DIF 310, which is a data verification code, is appended to each block 300. The DIF 310 includes, for example, a 2-byte CRC (Cyclic Redundancy Check) code 320 and a UDT (User Defined Tag) 330 with a total size of 6 bytes.

The CRC 320 is a code for detecting data bit errors corresponding to the prior-art LRC, and a calculation result of CRC for the 512-byte logical data block 300 is stored in the code. The UDT 330 includes a 2-byte application tag 340 and a 4-byte reference tag 350, each of which can be set to a given value by a user. Such tags are assumed to be used in a manner corresponding to that of the prior-art LA (Logical Address) (i.e., used for detecting errors in address (position)). That is, the UDT (application tag) 340 corresponds to the prior-art LUN (Logical Unit Number) and the UDT (reference tag) 350 corresponds to the prior-art LBA.

<Internal Configuration of Memory>

Figures 3, 4:
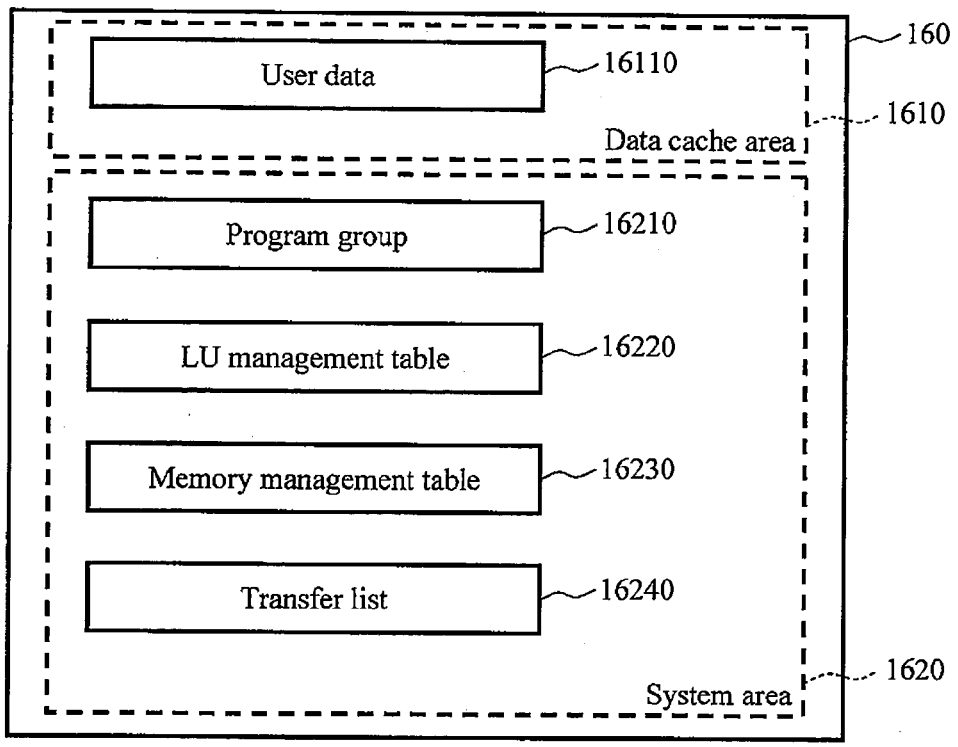
FIG. 3 is a diagram illustrating an internal configuration of a memory.
FIG. 4 is a diagram illustrating an exemplary configuration of an LU management table.

FIG. 3 is a diagram illustrating an internal configuration of the memory 160. As illustrated in FIG. 3, the memory 160 includes a data cache area 1610 used for temporarily storing user data and a system area 1620 in which programs and various tables for controlling the disk array device 10 are stored.

The data cache area 1610 is divided into multiple segments each having a given size so that each segment stores user data 16110.

The system area 1620 includes a program group 16210 having various programs to be executed by the CPU 150, an LU management table 16220 for managing the correspondence between the address space of an LU (Logical Unit) created in an RAID group and the physical address space in the disk device, a memory management table 16230 for managing the segments of the data cache area 1610, and a transfer list 16240 created by the CPU 150 and used for the CPU 150 to instruct the host adapter 110 or the disk adapter 130 to execute DMA transfer.

<Configuration of Each Table and Transfer List>

FIG. 4 is a diagram illustrating the configuration of the LU management table 16220. In FIG. 4, LUN 162210 represents an identifier of a created LU, and each identifier is assigned a unique number. LU size 162220 represents the capacity of each LU. Disk No. 162230 represents the disk number of the disk device 220 in which the LU is stored. START LBA 162240 and LAST LBA 162250 represent the start address and last address of the LU, respectively.

FIG. 5 is a diagram illustrating the configuration of the memory management table 16230. In FIG. 5, segment No. 162310 represents an identifier of each segment, and each identifier is assigned a unique number. LUN 162320, LBA 162330, and LENGTH 162340 represent information for managing user data stored in each segment. Specifically, LUN 162320 represents the LU number of the target data, LBA 162330 represents the start address of the target data in the LU, and LENGTH 162340 represents the data length of the target data. When the size of data to be stored is larger than the size of one segment, LUN, LBA, and LENGTH of the data are managed across multiple segments.

FIG. 6 illustrates the configuration of the transfer list 16240. The transfer list includes statements created by the CPU 150 for the host adapter 110. The host adapter 110 references the transfer list to execute a transfer process. Although FIG. 6 illustrates only one list, multiple transfer lists are actually created and stored in the memory 160.

In FIG. 6, list No. 162410 represents an identifier of each of the multiple lists, and each identifier is assigned a unique number. Transfer direction 162420 represents information about the DMA transfer direction. For example, the transfer direction is shown such that a direction in which data is transferred from a buffer to a device that executes DMA transfer is indicated by "RD (read)," whereas a direction in which data is entered into the buffer is indicated by "WR (write)."

Segment No. 162430 and LENGTH 162440 represent information about the destination address of DMA transfer and the size of data to be transferred, respectively. Check bit 162450, LUN 162460, and LBA 162470 represent information about the setting of the UDT 330 (details will be described later with reference to FIG. 7) used in this embodiment. Mode 162480 represents information about the operation mode concerning a DIF. Here, "APPEND" is entered when appending a DIF to data, "CHECK" is entered when performing only checking of a DIF, and a numerical value corresponding to a command such as "CHECK & DELETE" is entered when deleting the DIF after checking.

The transfer list 16240 illustrated in FIG. 6 is an example in which the host adapter 110 appends, for the segment No. 100 of the memory 160, a DIF to data with a length of 8 that should be stored in the LBA 200 of the LUN 10, and executes the process of writing "0" as a check bit.

Figure 7:
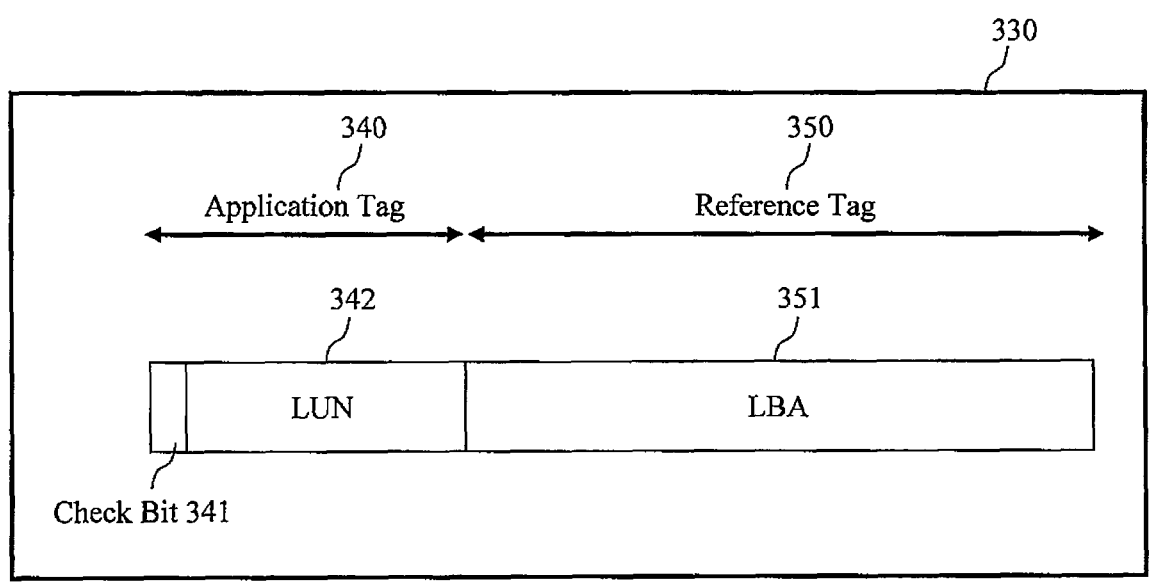
FIG. 7 is a diagram illustrating an exemplary format of a UDT used in the present invention.

FIG. 7 illustrates a usage example of the UDT (User-Defined Tag) according to an embodiment of the present invention. As illustrated in FIG. 7, as the UDT 330 of the present invention, a check bit 341 for verifying the successful data overwrite and an LUN 342 representing the LU number of the transfer destination are set in the application tag 340, while an LBA 351 is set in the reference tag 350. By defining the LUN 342 and the LBA 351 in this manner, an address error checking function similar to that of the prior-art LA can be realized. Further, using the check bit 341 makes it possible to ensure the successful completion of overwriting of data (old data) stored in the cache.

<Process of Ensuring the Successful Completion of Overwrite>

Figure 8:
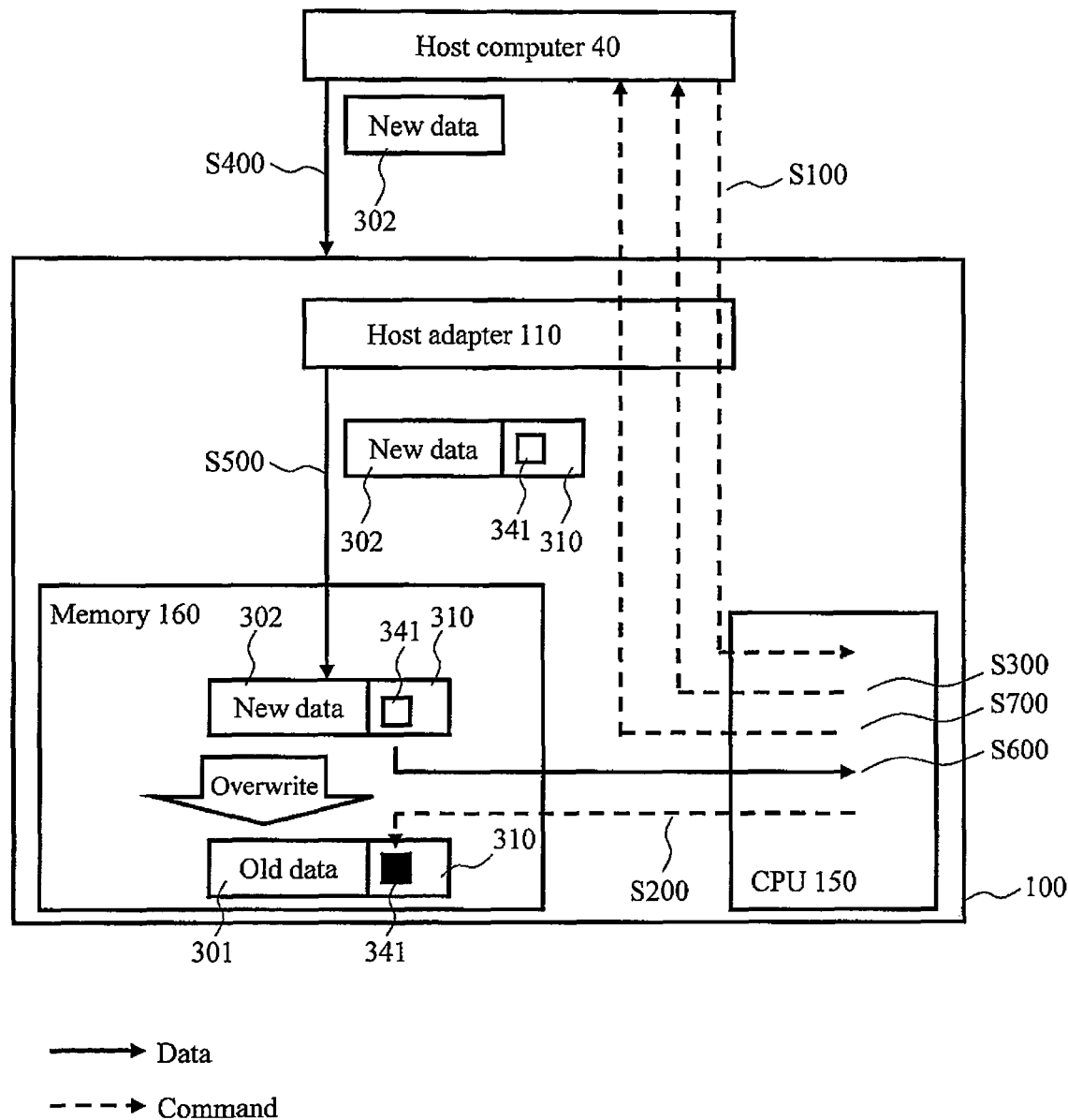
FIG. 8 is a diagram illustrating an overview of data overwrite operation.
Figure 9:
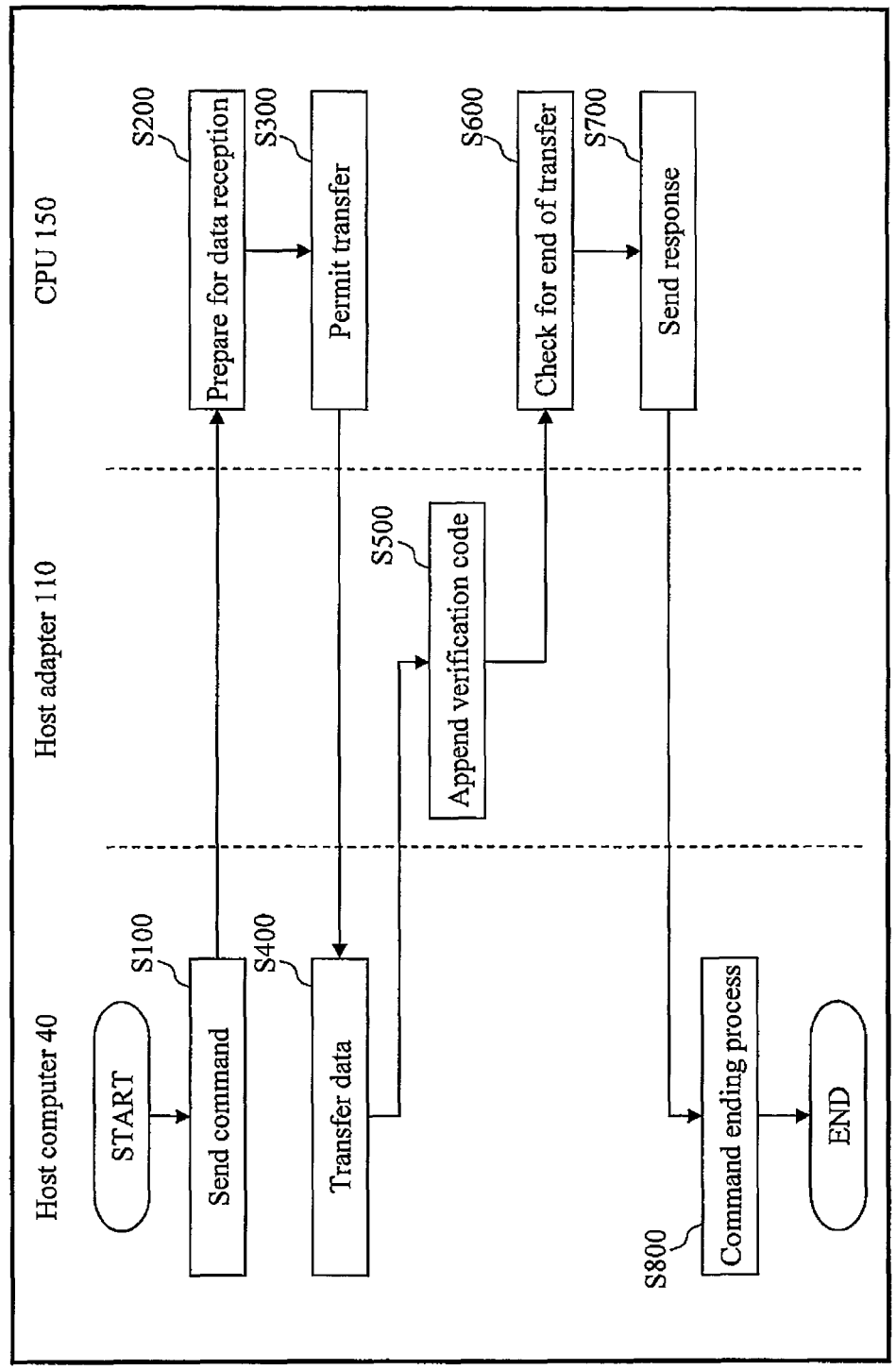
FIG. 9 is a flowchart illustrating a data overwrite.

Next, a specific operation (example) of the process of ensuring the successful completion of overwrite will be described with reference to FIGS. 8 and 9. FIG. 8 is a diagram illustrating an overview of the overwrite operation, which is the operation of updating data in a memory, and FIG. 9 is a flowchart illustrating the operation of FIG. 8.

FIG. 8 illustrates procedures starting from the step of updating, with the host computer 40, old data 301 stored in the memory 160 with new data 302 till the writing of the new data 302 to the memory. Flows of data are shown by solid lines, and flows of commands necessary for data transfer are shown by dashed lines.

The host computer 40 issues a data transfer request command (a write request) to the disk array device 10 (step S100). The CPU 150, upon receiving the command, analyzes the data transfer request command (identifies the LUN, LBA, and LENGTH), and executes a data reception preparation process. Analyzing such a command can determine if the old data 303 is present in the memory 160 (cache hit). As a specific data reception preparation process, the CPU 150, if the old data 301 is determined to be present in the cache, sets the check bit 341 appended to the old data 301 to "1 (colored black in FIG. 8)" indicative of non-updated data, and further creates a DMA transfer list (see FIG. 6) including information about the setting of a DIF to be appended to new data (for updating the old data) 302, for the host adapter 110. At this time, a check bit 341 of a DIF 310 to be appended to the new data 302 in the DMA transfer list is set to "0 (colored white in FIG. 8)" indicative of updated data (step S200). Meanwhile, if the old data is determined to be not present in the memory 160 (cache miss), the CPU 150 does not set a check bit, and instructs the host computer 40 to continue transferring data.

After that, the CPU 150 issues data transfer permission to the host computer 40 (step S300). The host computer 40, upon receiving the data transfer permission, initiates the transfer of the new data 302 to the disk array device 10 (step S400).

The host adapter 110, upon receiving the new data 302, appends a DIF to each block of the new data 302 in accordance with the setting information of the transfer list, and transfers the new data per block (see FIG. 2) to the memory 160. At this time, the check bit 341 of the DIF appended to the new data 302 is set to "0" indicative of updated data (step S500).

Upon termination of the transfer from the host adapter 110, the CPU 150 reads the UDT in the memory and checks for the validity of the UDT value including the check bit 341 (step S600). That is, if the old data 301 has been surely updated with the new data 302, the LUN 342 and the LBA 351 that correspond to the LA portion should remain unchanged because the data has just been overwritten, whereas the value of the check bit 341 should have changed to "0" indicative of updated data. After that, the CPU 150 sends a response corresponding to the check result to the host computer 40 via the host adapter 110 (step S700), and the host computer 40 executes the process of ending a command such as the end of data transfer or data retransmission in accordance with the response (step S800). Through the aforementioned steps, it is possible to ensure that the old data 301 has been successfully updated with the new data 302.

<Details of STEP S200>

Figure 10:
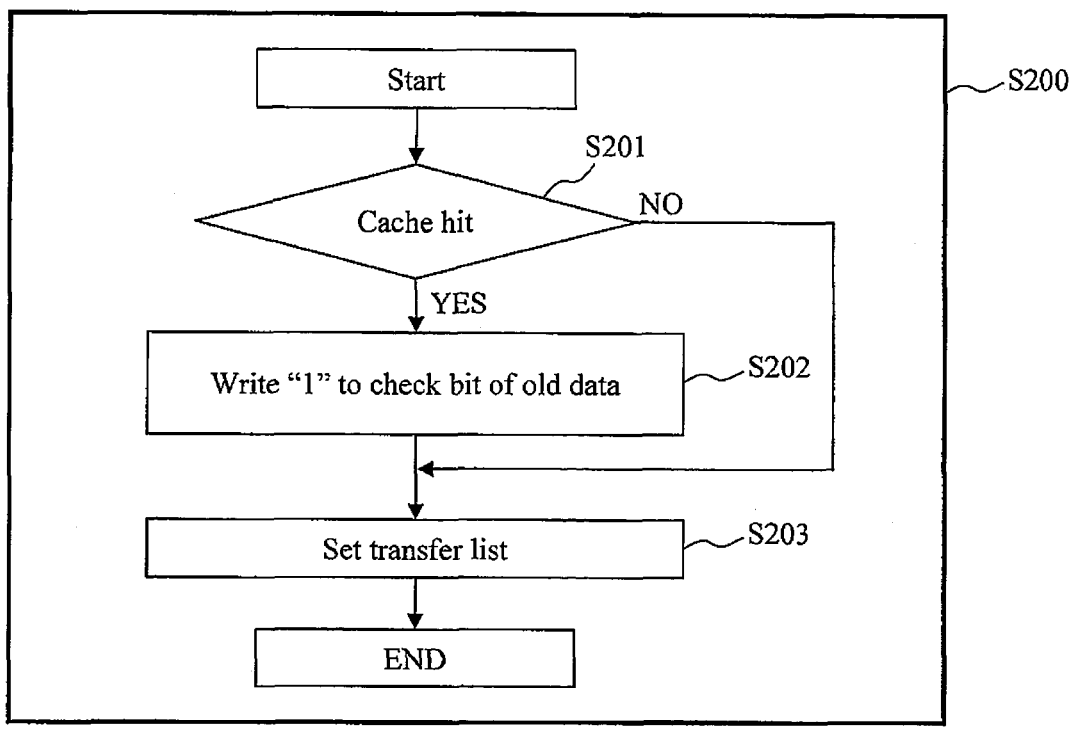
FIG. 10 is a flowchart illustrating a reception preparation process of a CPU performed in response to a data transfer request from a host computer.

FIG. 10 is a flowchart specifically illustrating step S200 which is the data reception preparation process.

The CPU 150, upon receiving a data write request from the host computer 40, references the memory management table 16230, in particular, LUN, LBA, and LENGTH of data to be written, which have been extracted from the target information included in the request command, and determines if the target data is present in the memory 160 (cache hit) (step S201). If the target data is determined to be present in the memory in step S201, the CPU 150 determines a hit (determination result: YES), and writes "1" indicative of non-updated data to the check bit of the data in the memory 160 (step S202). Then, the CPU 150 creates the transfer list 16240 that is the information necessary for the host adapter to execute DMA transfer (step S203), and ends the process. A specific example of the transfer list 16240 created in step S203 is a list (see FIG. 6) in which "the transfer direction 162420 indicates "WR," the DIF setting mode 162480 indicates "APPEND," the check bit 162450 indicates "0" indicative of updated data, the LUN 162460 indicates the LUN of the target data, and the LBA 162470 indicates the LBA of the target data.

Meanwhile, if the target data is determined to be not present in the memory in step S201, the CPU 150 determines a cache miss (determination result: NO) and does not execute step S202 which is the overwrite/update process. Thus, the flow proceeds to the creation of the DMA transfer list 16240.

<Details of STEP S500>

Figure 11:
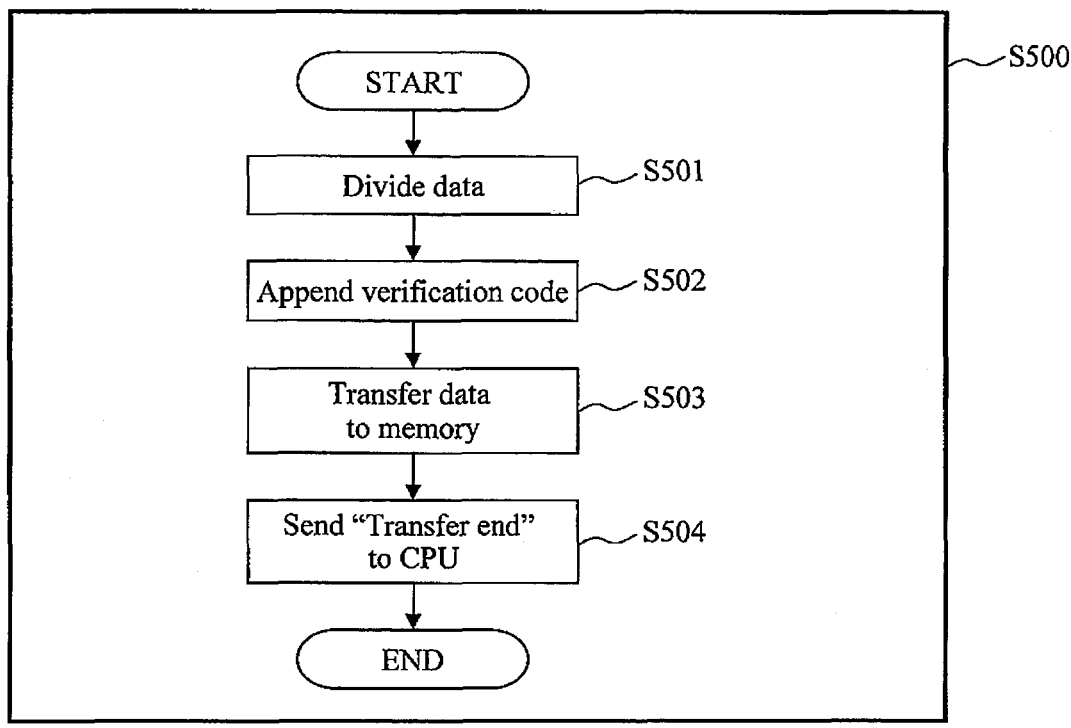
FIG. 11 is a flowchart illustrating the process of appending a verification code to data with a host adapter.

FIG. 11 is a flowchart specifically illustrating step S500 in which the host adapter 110 appends a DIF to data received from the host computer 40 and executes DMA transfer to the memory 160.

First, the host adapter 110 divides the data received from the host computer 40 into logical data blocks each having a constant data length (step S501), and appends a DIF verification code to each logical data block in accordance with the setting information of the transfer list 16240 (step S502).

Then, the host adapter 110 transfers the logical data block with the verification code to the memory 160 that is the transfer destination (step S503). Then, the host adapter 110 sends information about the end of data transfer to the CPU 150 (step S504). Note that, whether or not data transfer has ended can be determined by dividing the data size by the transfer unit length (e.g., 512 bytes+DIF), because it provides information about how many transfers are necessary.

<Details of STEP S600>

Figure 12:
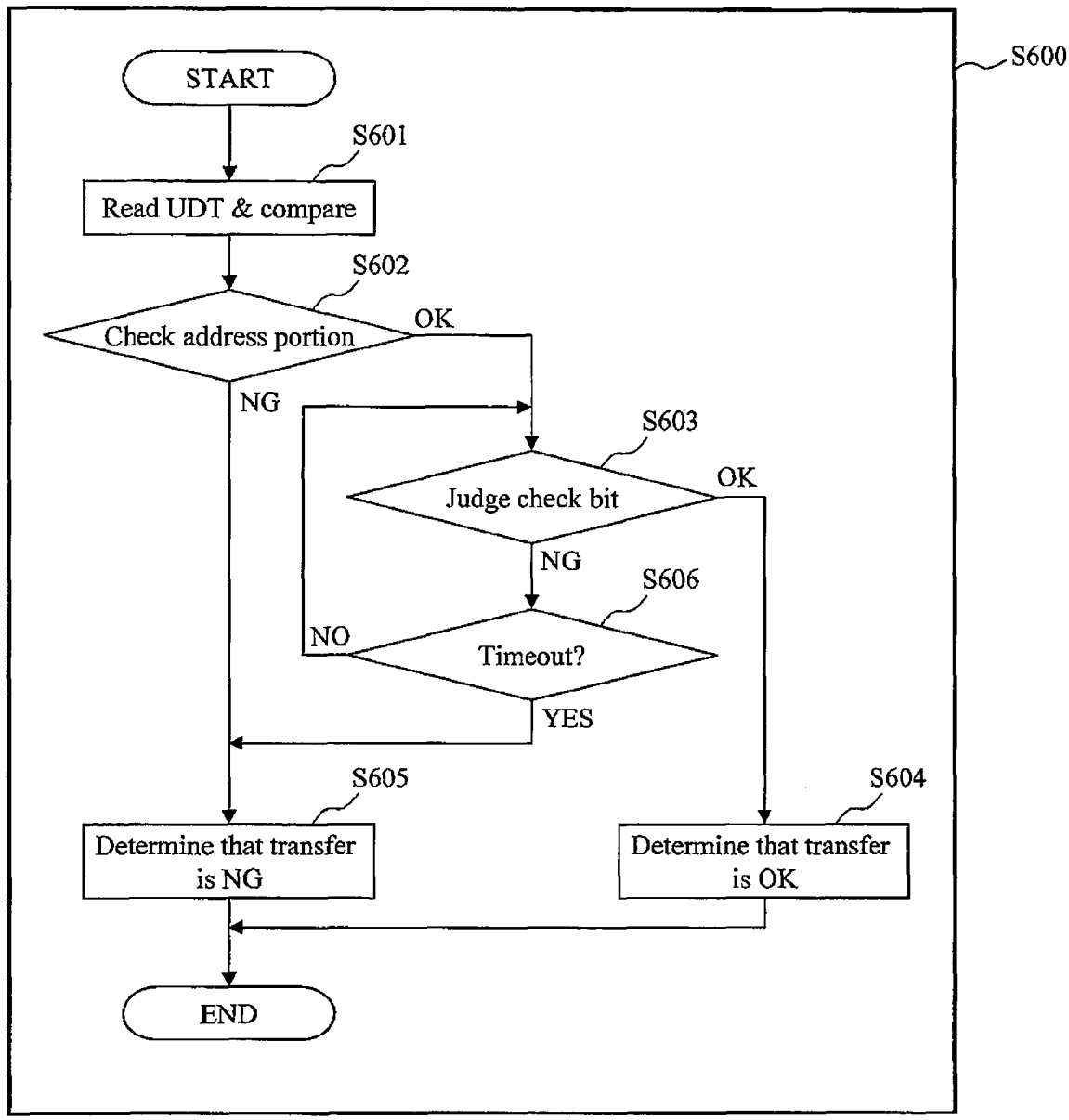
FIG. 12 is a flowchart illustrating the process of checking, with a CPU, the end of data transfer to a cache.

FIG. 12 is a flowchart specifically illustrating step S600 in which the CPU 150 checks if the data transferred to a cache has been accurately written.

The CPU 150, upon receiving information about the end of data transfer from the host adapter 110, reads the UDT of the target data from the memory that is the transfer destination, and checks if the read information matches the setting information. Specifically, the CPU 150 executes the process by referencing the transfer list 16240 and compares the setting information on the check bit 162450, the LUN 162460, and the LBA 162470 with the values of the actually appended UDT (step S601).

The values of the LUN and LBA that correspond to the address portion are checked (step S602), and if the check result is valid (determined to be OK), the flow proceeds to the process of judging a check bit (step S603). If the judge result of step S603 is valid (determined to be OK), the CPU 150 determines that the old data has been normally updated, and thus determines that the transfer is OK (step S604), thereby ending the process.

Meanwhile, if the judge result of step S603 is not valid, it is determined that the data has not been updated (determined to be NG), and the flow proceeds to step S606 in which whether or not timeout has occurred is determined. In step S606, the CPU 150 determines if a predetermined time has elapsed since step S603. If it is determined that the predetermined time has not elapsed yet (determined to be NO), the CPU 150 executes the process of step S603 again. If it is determined that the predetermined time has elapsed, the CPU 150 determines that some failure has occurred (determined to be YES) and thus determines that the transfer is NG (step S605).

Meanwhile, if the check result of the address portion in step S602 is not valid (determined to be NG), the CPU 150 determines the transfer to be abnormal, and thus determines that the transfer is NG (step S605).

<Details of STEP S700>

Figure 13:
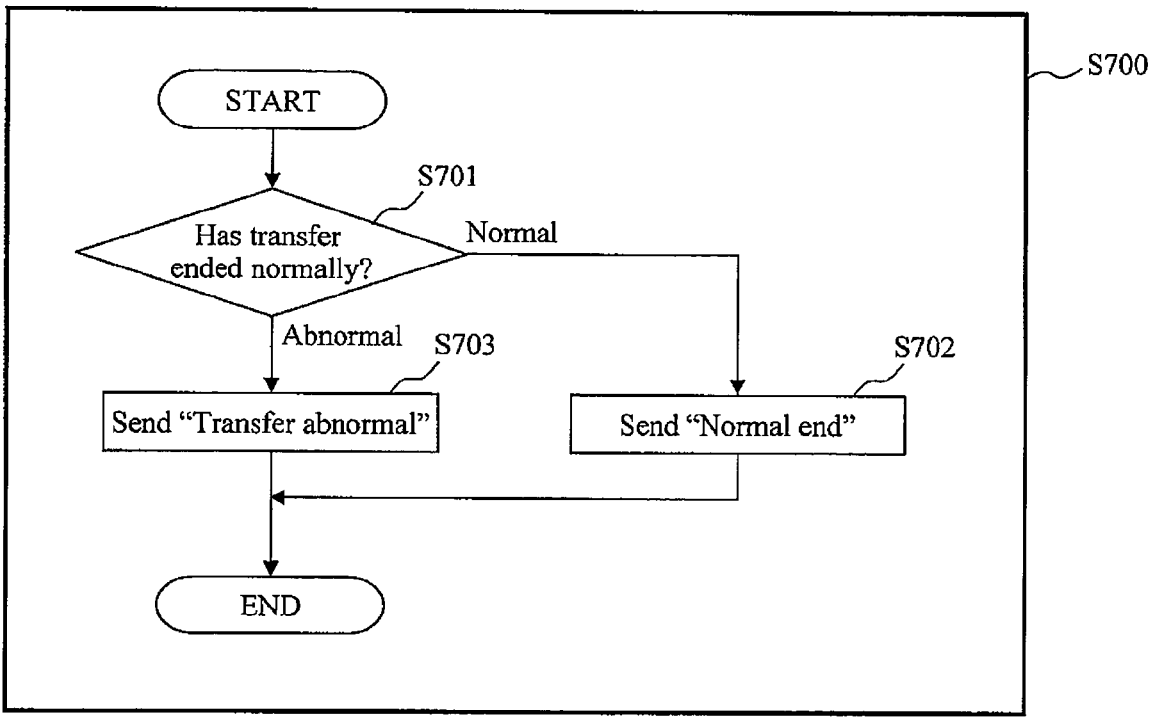
FIG. 13 is a flowchart illustrating the process of sending a data transfer result from a CPU to a host computer.

FIG. 13 is a flowchart specifically illustrating step S700 in which the CPU 150 sends a transfer end status to the host computer 40.

First, the CPU 150, on the basis of the determination result of step S600, determines if data transfer has ended normally (step S701). If the data transfer is determined to have ended normally (determined to be "NORMAL"), the CPU 150 sends "NORMAL END" to the host computer 40, and ends the process (step S702).

Meanwhile, if the determination result of step S701 is not normal (determined to be "ABNORMAL"), the CPU 150 sends "TRANSFER ABNORMAL," which indicates that the data transfer has failed, to the host computer 40 (step S703), and ends the process.

As described above, according to the present invention, when data is transferred from the host computer 40 to the memory 160 in data writing, it is possible to ensure that data has been successfully written to the memory 160 before informing the host computer 40 of the end of data transfer.

<Additional Descriptions, etc.>

In the illustration of each of the aforementioned steps, only a write flow has been described on the assumption that data is asynchronously written to the memory 160. It should be noted that the disk array device 10 executes the process of storing data in the memory 160 to the disk device 220 at a given timing.

In addition, in this embodiment, an object that is checked for the purpose of verifying the successful completion of data transfer is limited only to the UDT 330 in consideration of adverse effect on the performance of the CPU 150. That is, in order to ensure the successful completion of transfer, it is typically necessary to compare a result obtained by recalculating UDT(LA)/CRC(LRC) and the like from the data transferred to the cache memory with the values appended thereto by the host adapter so as to determine if the two values match. UDT(LA) represents the positional information such as an address. Thus, it can be checked by simple comparison. In contrast, when CRC(LRC), which is obtained by performing EXCLUSIVE-OR operation or the like on the data portion, is to be checked, it becomes necessary to perform EXCLUSIVE-OR operation or the like on the data in the cache memory. When such a process is executed by the CPU 150, resources of the CPU 150 would be consumed, which in turn could deteriorate the I/O processing performance of the device. For this reason, the checked object in the first embodiment is limited to the UDT 330.

Figure 14:
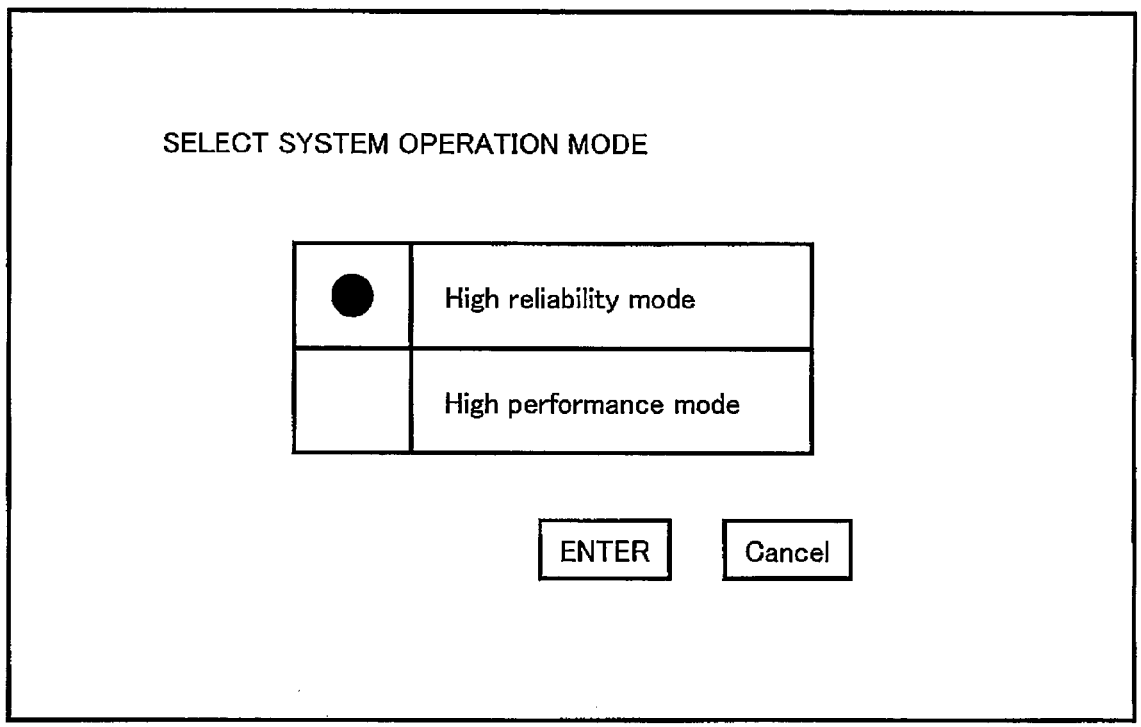
FIG. 14 is a diagram illustrating an example in which management software shows an interface for setting the operation mode to a user.

However, it is also possible to check the entire DIF 310 including the CRC 320 in order to improve the reliability. In such a case, the object to be read and compared in step S601 illustrated in FIG. 12 can be the entire DIF 310. Further, when an interface that enables the setting and confirmation of the check operation is provided by means of software installed on the host computer 40, it becomes also possible to set the conditions of the check operation that meet the users' requirements. Specifically, such setting can be realized by providing, with control software, two patterns that are a DIF 310 full-check mode (a high reliability mode) in which 100% data reliability is ensured though the I/O processing performance of the CPU 150 could be lower, and a UDT 330 simple-check mode (a high performance mode) in which a decrease in I/O processing performance of the CPU 150 is suppressed though the reliability could be relatively lower in comparison with the case of the full check mode. FIG. 14 illustrates an exemplary interface of such control software.

(2) SECOND EMBODIMENT

The second embodiment concerns a disk array system (storage system) in which two controllers 100 are provided in the disk array device 10. Such a duplex configuration is adapted in order to avoid system down of the disk array device 10 due to a single point of failure of the controller 100. Although this embodiment illustrates a case in which the system includes two controllers 100, the number of the controllers is not limited to two. Described hereinafter are mainly the differences from the first embodiment.

<System Configuration>

Figure 15:
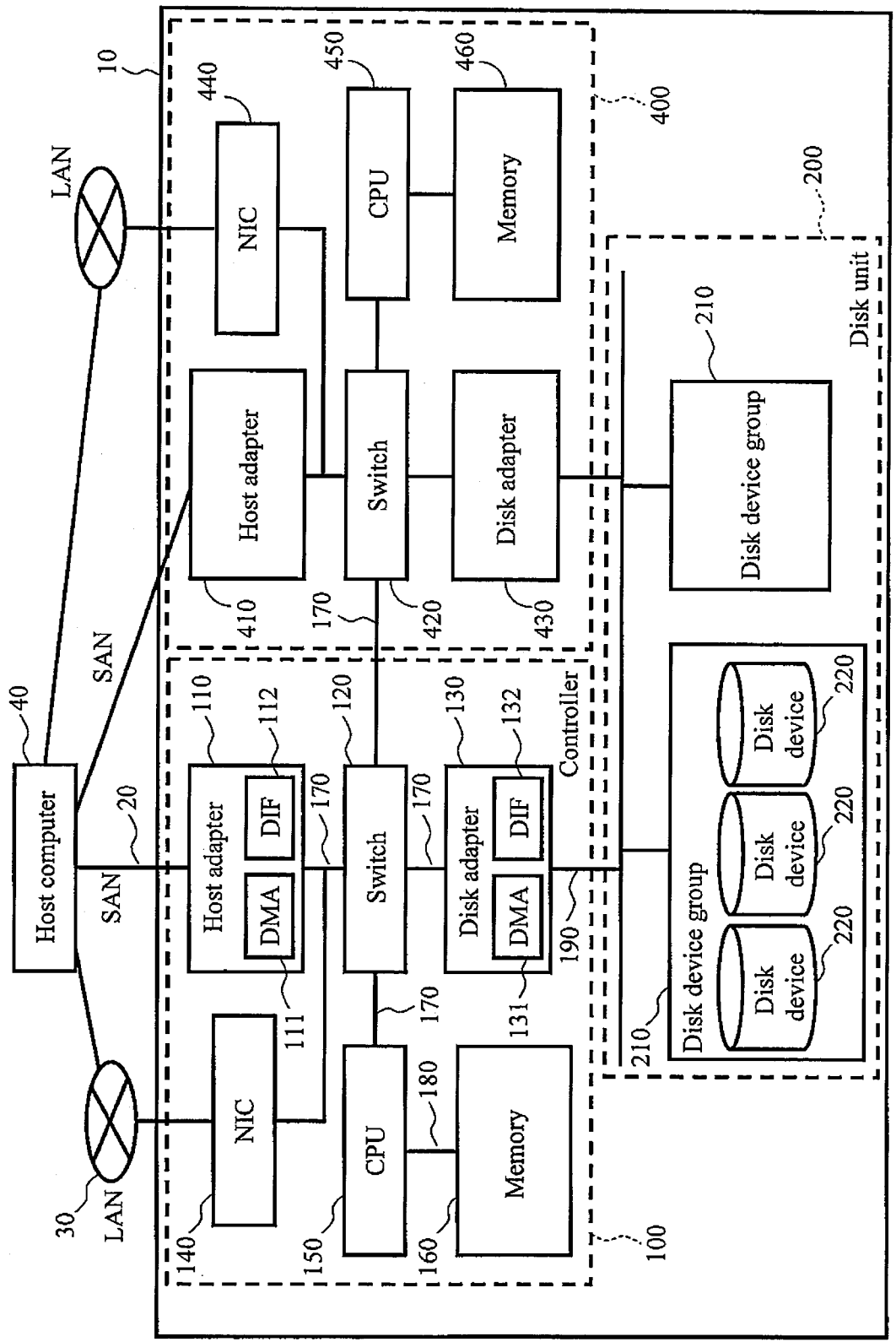
FIG. 15 is a block diagram illustrating a schematic configuration of a disk array system according to the second embodiment.

FIG. 15 illustrates a schematic configuration of a disk array system (storage system) according to the second embodiment of the present invention. As in the first embodiment, the disk array system includes a disk array device (storage device) 10 and a host computer 40. However, the internal configuration of the disk array device differs from that of the first embodiment as illustrated in FIG. 15.

In the disk array device 10 illustrated in FIG. 15, two controllers 100 and 400 are connected via a dedicated communication line 170, and the two controllers share a single disk unit 200. Further, in the second embodiment, data transferred from the host computer 40 is copied with the use of a copy function of a switch 120 provided in the controller 100 on a side that has received the data (hereinafter referred to as a "primary" controller). Then, one piece of such data is transferred to the primary memory 160 while the other piece of such data is transferred to a memory 460 in the controller 400 on the other side (hereinafter referred to as a "secondary" controller). Accordingly, "mirror-write" operation is realized in which data to be written is concurrently stored in the primary memory 160 and the secondary memory 460 within the disk array device 10. In a case in which the switch 120 does not have a copy function, data is once stored in the primary memory 160, and thereafter, the primary CPU 150 transfers the data to the secondary memory 460, whereby mirror-write operation is realized. With the realization of such mirror-write operation, even when the primary controller 100 fails before the data stored in the primary memory 160 is stored in the disk device 220, the secondary controller 400 can take over the process and write the data to the disk device 220 because the secondary memory 460 stores the same data as the primary memory 160.

<Internal Configuration of Memory>

The basic process of overwriting is the same as that of the flowchart in FIG. 9. However, processes that differ from those in the first embodiment are performed in step S200 (a data reception preparation process) and step S600 (a process of checking if data transfer has ended). That is, in step S200, when overwriting is to be performed and a check bit of data stored in each of the primary memory 160 and the secondary memory 460 is changed, if it can be confirmed that the check bit of the data stored in the secondary memory 460 has been updated, the flow proceeds to step S300 which is a data transfer permitting phase. In addition, in step S600, it is confirmed that writing of the data transferred to each of the primary memory 160 and the secondary memory 460 has been completed. Then, the flow proceeds to step S700 in which the host computer 40 is notified of the transfer result.

In order to realize the aforementioned processes, the primary CPU 150 and the secondary CPU 450 should share a process request, a response thereto, and the processing status.

To this end, in the second embodiment, the system area 1620 of the memory 160 includes two additional tables.

Figures 16, 17:
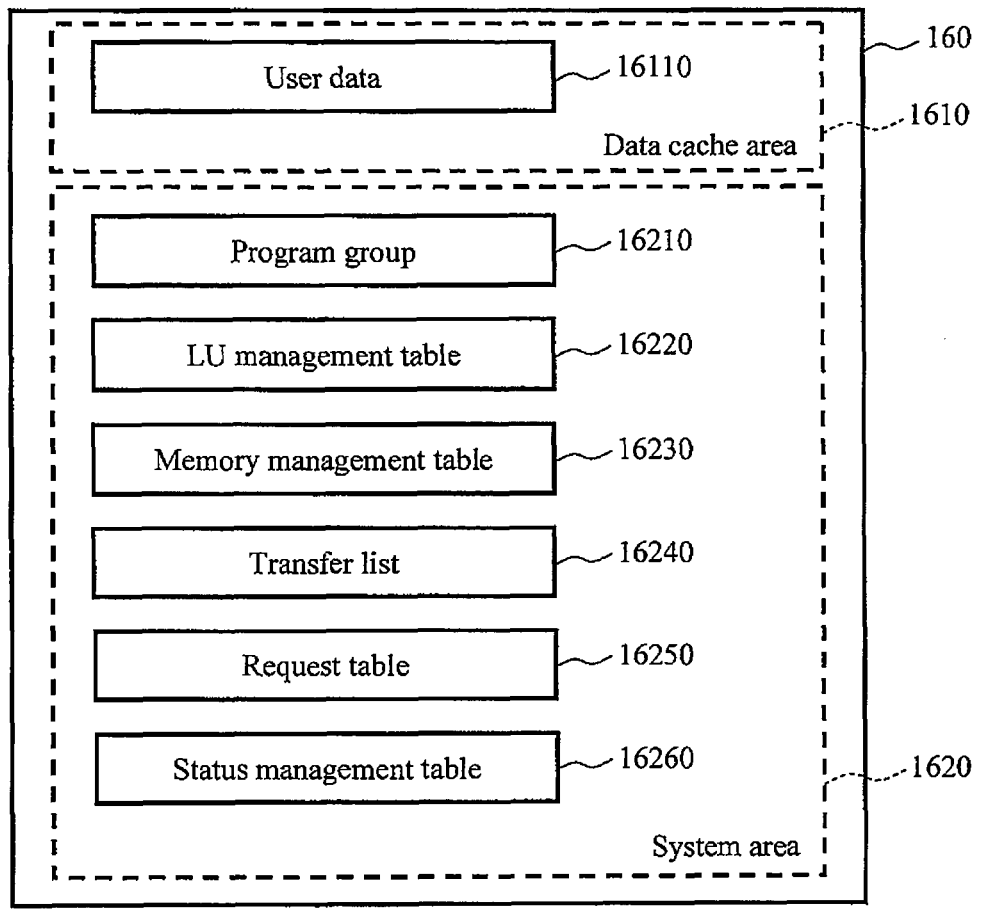
FIG. 16 is a diagram illustrating an internal configuration of a memory according to the second embodiment.
FIG. 17 is a diagram illustrating an exemplary configuration of a request table 16250.

FIG. 16 is a diagram illustrating an internal configuration of the memory 160 according to the second embodiment. As illustrated in FIG. 16, the memory 160 of the second embodiment includes additional tables that are a request table 16250 (see FIG. 17) used for the primary CPU 150 and the secondary CPU 450 to issue processing requests and send the processing results, and a status management table 16260 (FIG. 18) used for the primary CPU 150 and the secondary CPU 450 to share the mutual processing statuses in response to requests.

<Contents of the Additional Tables>

FIG. 17 is a diagram illustrating an exemplary configuration of the request table 16250. The request table is issued when the primary device requests the secondary device to check a verification code of the target data.

In FIG. 17, list No. 162510 represents the number assigned in order to identify a request table among multiple request tables. Segment No. 162520 represents the number of a segment in the secondary memory 460 in which data to be processed is stored. Check bit 162540, LUN 162550, and LBA 162560 represent expected values of data to be checked. As a method for knowing the segment No. of the secondary memory (cache memory), a method disclosed in Patent Literature 2 (a technique with which the status of the secondary memory can be referenced) can be used, for example.

FIG. 17 illustrates a setting example in which the primary CPU 150 requests the secondary CPU 450 to check if the verification code of data stored in a position of the segment No. 100 of the secondary memory has a check bit of "1," LUN of "10," and LBA of "200."

In addition, result 162570 represents an area in which a check result sent from the secondary CPU 450 is stored. If a verification code that has been appended matches the requested information, "OK" is entered, and if not, "NG" is entered. When a check result is not entered, the result 162570 indicates "N/A."

FIG. 18 is a diagram illustrating an exemplary configuration of the status management table 16260. This status management table is used for managing the status of a request sent from the primary CPU to the secondary CPU.

In FIG. 18, list No. 162610 has the identical number as the list No. 162510 of the request table 16250. Accordingly, management of the status of each request is possible. Primary status 162620 represents the processing status of the primary CPU which is the source of a request, and primary update time 162630 represents the time when the primary CPU 150 has updated the primary status 162620. Secondary status 162640 represents the processing status of the secondary CPU 450 which is the destination of a request, and secondary update time 162650 represents the time when the secondary CPU 450 has updated the secondary status 162640. A specific usage of the status management table 16260 will become apparent from the description given later with reference to FIG. 21.

<Process of Ensuring the Successful Completion of Overwrite>

The basic process of overwriting is the same as that of the flowchart in FIG. 9. Thus, processes that differ from those of the first embodiment, namely, step S200 (a data reception preparation process) and step S600 (a process of checking if data transfer has ended) will be described below.

Figure 19:
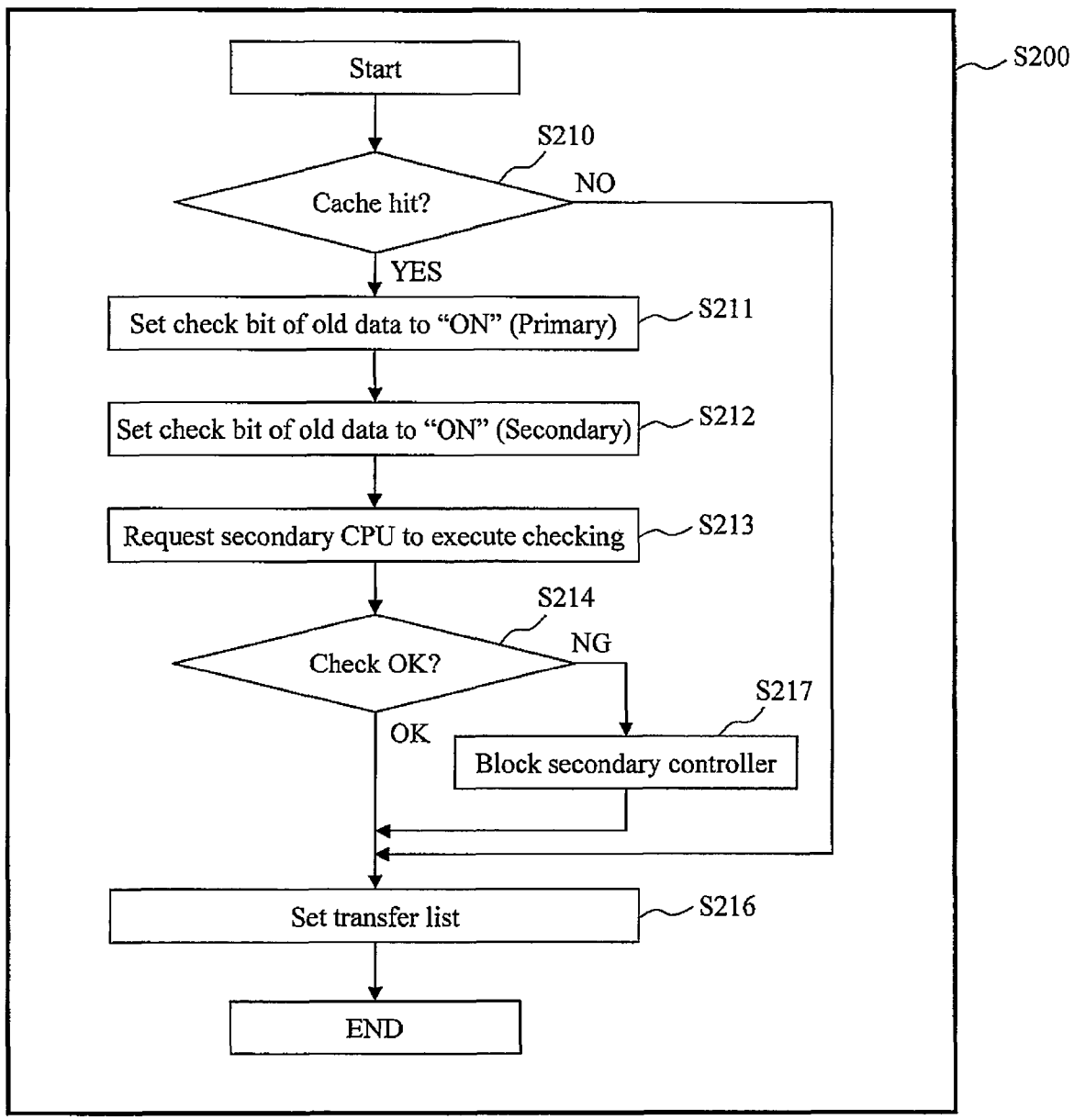
FIG. 19 is a flowchart illustrating the details of a reception preparation process of a CPU performed in response to a data transfer request from a host computer according to the second embodiment.

FIG. 19 is a flowchart illustrating the details of the reception preparation process (step S200) of the primary CPU 150 performed in response to a data transfer request from the host computer 40 according to the second embodiment.

First, the primary CPU 150, upon receiving a data write request from the host computer 40, references the memory management table 16230, in particular, LUN, LBA, and LENGTH of data to be written, which have been extracted from the target information included in the request command, and determines the presence or absence of the target data in the primary memory 160 (step S210).

If the target data is determined to be present in the memory in step S210, the primary CPU 150 determines a cache hit (determination result: YES), and writes "1," which indicates that the old data is non-updated data, to the check bit of the data in the primary memory 160 (step S211). Next, the primary CPU 150 writes "1" indicative of non-updated data to the check bit of the data in the secondary memory 460 (step S212), and issues a check request with the request table 16250 to the secondary CPU 450 (step S213: details will be described with reference to FIG. 20).

If the check result of the secondary CPU 450 is determined to be normal (determined to be OK), the primary CPU 150 determines that the check bit of the target data has been accurately updated, and creates a transfer list 16240 that is the information necessary to execute DMA transfer (transfer executed by the host adapter) (step S216), thereby ending the process.

Meanwhile, if the check result of the secondary CPU 450 is determined to be not normal in step S214 (determined to be NG), the primary CPU 150 determines that the secondary controller 400 is not operating normally due to, for example, program errors or hardware faults, and blocks the operation of the secondary controller 400. At the same time, the primary CPU 150 notifies an administrator of the failure via control software of the host computer 40, and switches the operation to a single operation of only the primary controller 100 (step S217). After that, the primary CPU 150 sets a DAM transfer list (step S216), and ends the process.

Meanwhile, if the target data is determined to be not present in the memory in step S210, the primary CPU 150 determines a cache miss (determination result: NO). Then, the flow proceeds to step S216 which is the process of setting the DMA transfer list 16240.

Figure 20:
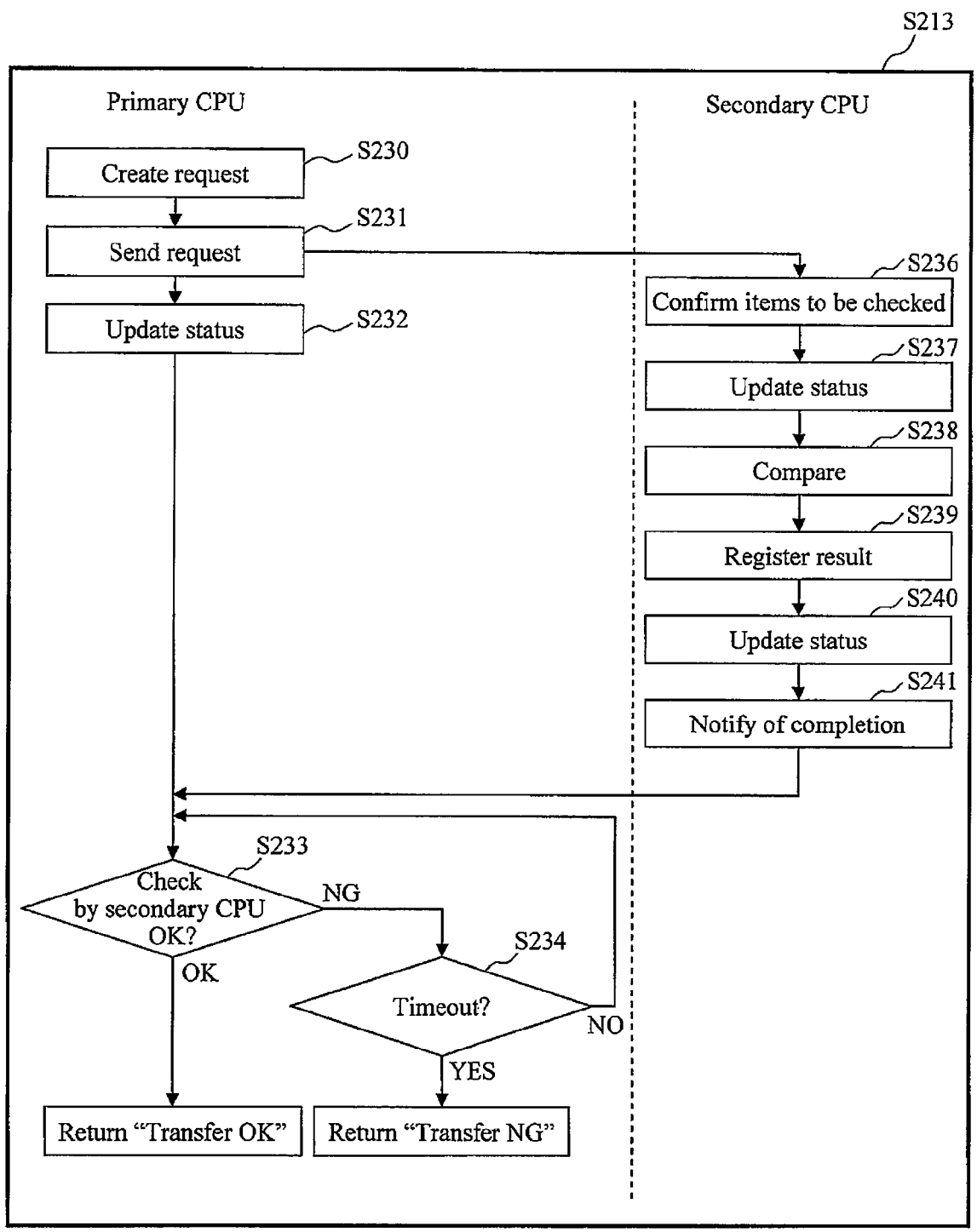
FIG. 20 is a flowchart illustrating the details of a process starting from the issuance of a check request from a primary CPU to a secondary CPU till the acquisition of an end result.

FIG. 20 is a flowchart illustrating the details of step S213 in which the primary CPU 150 issues a check request to the secondary CPU 450 and obtains an end result.

First, the primary CPU 150 initializes the request table 16250 and the status management table 16260, and sets information on the segment No., check bit value, LUN, and LBA of the data to be checked in the request table 16250 (step S230). Then, the primary CPU 150 sends a check request to the secondary CPU 450 by notifying the secondary CPU 450 of the list No. 162510 of the request table 16250 (step S231). Here, in step S230, the result 162570 of the request table 16250 indicates "N/A" which is the initial value.

Following step S231, the primary CPU 150 changes the primary status 162620 of the status management table 16260 corresponding to the request table 16250 to "REQUESTING," and enters the current time into the primary update time 162630 (step S232). Then, the primary CPU 150 checks if the result 162570 of the request table 16250 is updated to "OK" which indicates that the check is OK or "NG" which indicates that there is a check abnormality (step S233). If the result 162570 indicates "OK," the primary CPU 150 determines that the checking by the secondary CPU 150 has ended normally, and returns "Transfer OK" as a check result, thereby ending the process.

Meanwhile, if the determination result of step S233 is NG, the primary CPU 150 executes a timeout check in which whether or not the difference between the current time and the primary update time 162630 or the secondary update time 162650 has exceeded a predetermined time is determined (step S234). If the determination result of step S234 is YES, the primary CPU 150 determines that some failure has occurred in the secondary controller 400, and returns "Transfer NG" as a determination result, thereby ending the process.

Meanwhile, if the determination result of step S234 is NO, the flow returns to step S233 again in which the update status of the checking by the secondary CPU is checked.

When the secondary CPU 450 receives the check request issued in step S231, it references the request table 16250, and confirms the items to be checked (step S236). Then, the secondary CPU 450 updates the secondary status 162640 of the status management table 16260 to "PROCESSING," and enters the current time into the secondary update time 162650 (step S237). Next, the secondary CPU 450 reads the UDT of the data to be checked, and makes comparison to see if the UDT is equal to that described in the request table 16250 (step S238). If all of the items match, the secondary CPU 450 enters "OK" which indicates a normal check result, whereas if there are some mismatch items, the secondary CPU 450 enters "NG" which indicates an abnormal check result into the result 162570 of the request table 16250 (step S239). Then, the secondary CPU 450 enters "COMPLETE" into the secondary status 162640 of the status management table 16260, and enters the current time into the secondary update time 162650 (step S240). After that, the secondary CPU 450 informs the primary CPU 150 of the end of the checking by notifying the primary CPU 150 of the list No. 162510 of the request table 16250 (step S241).

<Changes in Status Management Table>

Figure 21:
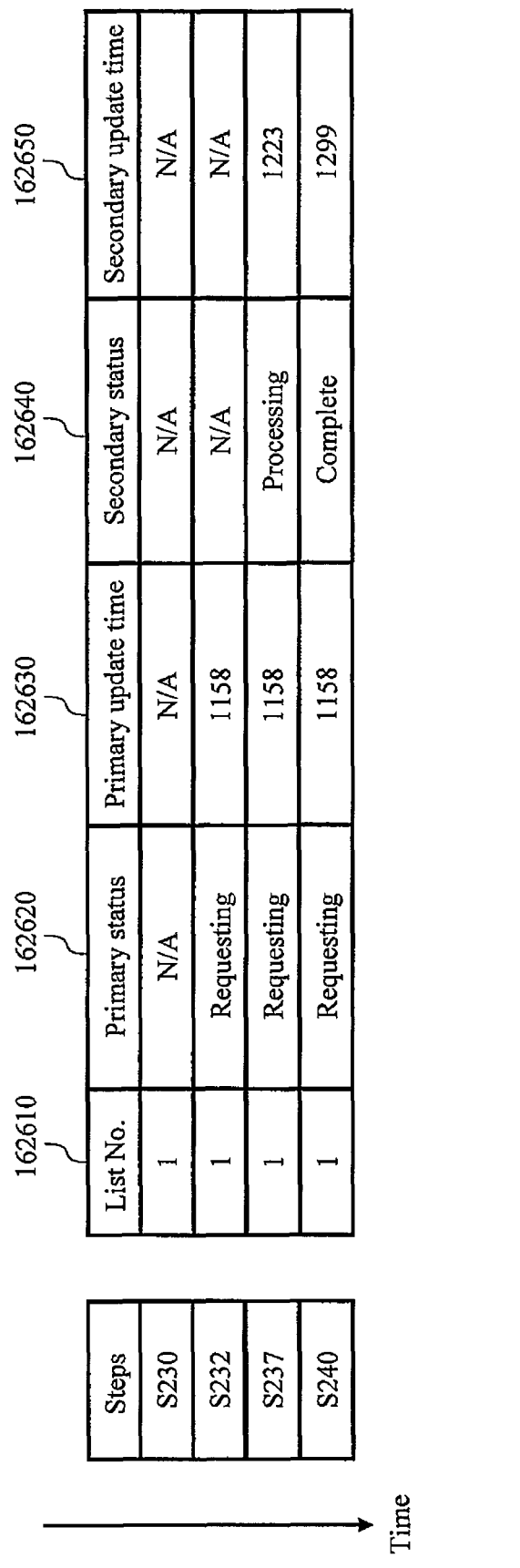
FIG. 21 is a diagram illustrating an overview of communication between a primary CPU and a secondary CPU.

FIG. 21 is a supplemental illustration of communication between the primary CPU 150 and the secondary CPU 450, in which the update timing of the status management table 16260 and input values are represented in chronological order. The column of "STEPS" corresponds to the number of each step in FIG. 20.

First, when the status management table 16260 is initialized in step S230, all of the input values turn to "N/A" indicative of the initial value. Next, when the primary CPU 150 sends a check request to the secondary CPU 450 in step S232, the primary status 162620 is updated to "REQUESTING" and the primary update time 162630 is changed to the update time of the primary status 162620.

Meanwhile, the secondary status 162640 and the secondary update time 162650 remain unchanged at the initial value of "N/A." After that, when the secondary CPU 450 starts checking in step S237, the secondary status 162640 is updated to "PROCESSING" and the secondary update time 162650 is changed to the update time of the secondary status 162640. Then, upon termination of the checking by the secondary CPU 450 in step S240, the secondary status 162640 is updated to "COMPLETE" and the secondary update time 162650 is changed to the update time of the secondary status 162640. Each of the primary update time and the secondary update time is expressed by the value of a clock counter of the CPU.

<Additional Descriptions>

According to the aforementioned update flow, the primary CPU 150, which is the source of a request, can confirm the check status of the secondary CPU 450, which is the destination of the request. In addition, by recoding the update time, it is possible for the primary CPU 150, when there has been no response from the secondary CPU 450 for a certain period of time or longer, to know that some failures may possibly have occurred in the secondary controller 400.

In addition, in step S600 which is the check process performed after the data transfer from the host adapter 110, it is necessary to check if the data in each of the primary memory 160 and the secondary memory 460 has been accurately updated. However, such a checking process can also be executed by using the flowcharts illustrated in FIGS. 19 and 20.

Accordingly, in the second embodiment, a response can be returned to the host computer 40 after it is confirmed that mirrored data has been written to each of the memory 160 and the memory 460.

In addition, although a DIF is used as a verification code in the first and second embodiments, it is possible, even when LA/LRC is used, to implement a similar function to that of the present embodiment by providing the LA/LRC with a check bit for verifying the successful overwrite.

(3) CONCLUSION i) The present invention can be applied to disk array devices in which data is stored highly reliably and at high speed.

ii) In the present invention, the old data 301 to be updated, which has a verification code 310 including the positional information of the data in the disk unit 200 (LUN 342 and LBA 351) as well as the check bit 341 for ensuring the successful writing, is stored in the memory 160. The CPU 150, upon receiving a write request of the new data 302 for updating the old data 301 from the host computer 40, changes the value of the check bit 341 of the old data 301 to "1" which is different from the value "0" to be appended to the new data 302, and then instructs the host computer 40 to initiate transfer of the new data 302. The host adapter 110 appends a verification code 310, which includes positional information and a check bit 341 (set to "0") for ensuring the successful writing, to the new data (302) received from the host computer 40, and transfers the new data with the verification code appended thereto to the memory 160. Accordingly, when the new data 302 has been accurately written to the memory 160, the check information bit 341 ("1") that has been changed is changed back to the original check information ("0"). Accordingly, if the check bit of the data in the memory 160 remains at "1," it is possible to determine that an overwrite save has not been completed. Thus, the session of the data transfer from the host computer 40 can be ended after it is determined that an overwrite save has been successfully completed. Accordingly, the possibility of data loss that could occur in the disk array device 10 can be reduced.

The host adapter 110 sends information about the completion of the writing of the new data 302 to the memory 160, from the CPU 150 to the host computer 40. After receiving such information, the host computer 40 ends the data transfer. Accordingly, it is ensured that the data in the memory 160 has been successfully updated with the new data, whereby the data transfer session can be ended safely.

Further, when the verification code 310 includes the CRC code 320 for detecting data errors, the CPU 150 may be configured to compare information obtained by computing the new data 302 written to the memory 160 with the CRC code 320, and if the two values match, determine that the new data 302 has been successfully written to the memory 160. Accordingly, even when data errors occur during data transfer, it is possible to prevent the transfer session from ending in a state in which the data containing errors is written in the memory 160. However, implementation of such a CRC code check could increase the load on the CPU 150. Thus, by performing the process of verifying the successful overwrite with the use of only the UDT (LA) 330 and the check bit 341, the load on the CPU 150 can be reduced (a decrease in I/O processing performance can be avoided). That is, according to the present invention, whether to use a CRC or not can be determined depending on which of the reliability and performance is prioritized.

iii) According to another aspect of the present invention, the (primary) controller 100 and the (secondary) controller 400 having a similar configuration to the controller 100 are provided so that the two controllers can communicate with each other and data mirroring is realized. The process operation of the primary controller 100 is controlled such that it can perform, in addition to the operation described in the first embodiment, the process of changing the check bit of the old data in the secondary memory 460 from "0" to "1" so that a copy of the new data can be surely written to the secondary memory 460 as in the primary memory. Accordingly, the identical updated data can be retained in the primary memory and the secondary memory, and even when a failure occurs in the primary controller, data that has been surely updated/overwritten and verified can be read from the secondary memory 460.

In this embodiment, the primary CPU 150 directly checks the content of the secondary memory 460 and changes the check bit. However, it is also possible to use a configuration in which the primary CPU 150 requests the secondary CPU 450 to check the content of the secondary memory 460 and change the check bit, in response to which the secondary CPU 450 checks the content of the secondary memory 460 and changes the check bit.

iv) It should be noted that the present invention can also be realized by a program code of software that implements the functions of the embodiments. In such a case, a storage medium having recorded therein the program code is provided to a system or an apparatus, and a computer (or a CPU or an MPU) in the system or the apparatus reads the program code stored in the storage medium. In this case, the program code itself read from the storage medium implements the functions of the aforementioned embodiments, and the program code itself and the storage medium having stored therein the program code constitute the present invention. As the storage medium for supplying such a program code, for example, a flexible disk, CD-ROM, DVD-ROM, hard disk, optical disk, magneto-optical disk, CD-R, magnetic tape, nonvolatile memory card, ROM, or the like is used.

Further, based on an instruction of the program code, an OS (operating system) running on the computer or the like may perform some or all of actual processes, and the functions of the aforementioned embodiments may be implemented by those processes. Furthermore, after the program code read from the storage medium is written to the memory in the computer, based on the instruction of the program code, the CPU or the like of the computer may perform some or all of the actual processes, and the functions of the aforementioned embodiments may be implemented by those processes.

Moreover, the program code of the software that implements the functions of the embodiments may be distributed via a network, and thereby stored in storage means such as the hard disk or the memory in the system or the apparatus, or the storage medium such as a CD-RW or CD-R, and at the point of use, the computer (or the CPU or the MPU) in the system or the apparatus may read the program code stored in the aforementioned storage means or the aforementioned storage medium and execute the program code.

REFERENCE SIGNS LIST

10: disk array device
20: SAN
30: LAN
40: host computer
100: disk array device controller
110: host adapter 120: switch
130: disk adapter
140: MC
150: CPU
160: memory
170: internal bus
180: dedicated memory bus
190: dedicated disk adapter bus
200: disk unit of disk array device
210: disk device group
220: disk device

The invention claimed is:

1. A storage device comprising:
a cache memory configured to store data from a host computer;
a host adapter coupled to the host computer;
a processor configured to control the cache memory; and
a disk unit;
wherein when the host adapter receives a first write request with write data from the host computer, the write data not being written in the cache memory, the host adapter is configured to:
add positional information of the write data in the disk unit and check information set as first data to the write data;
write the write data with the positional information and the check information to the cache memory; and
check whether the positional information written in the cache memory is correct; and
wherein when the host adapter receives a second write request with update data to the write data in the cache memory,
the processor is configured to change the check information of the write data in the cache memory from the first data to second data; and then
the host adapter is configured to:
add positional information of the update data in the disk unit, which positional information is the same as the positional information of the write data and check information set as the first data to the update data;
overwrite the write data with the positional information and the check information set as the second data in the cache memory by the update data with the positional information and the check information set as the first data to the cache memory; and
check whether the positional information written in the cache memory is correct and whether the check information is set as the first data.

2. The storage device according to claim 1, wherein:
the disk unit comprises multiple disk devices;
the positional information comprises a logical unit number of the disk unit that is a storage position of data and a start address information of the data in the logical unit;
the first and second write requests include the logical unit number, the start address information, and a data length of, respectively, the write data and the update data;
the host adapter is configured to:
create multiple data blocks by dividing the write data into multiple groups, each having a predetermined length;
add positional information of the write data in the disk unit and check information set as the first data to each data block;
write the write data with the positional information and the check information set as the first data to the cache memory per block; and
check whether the positional information written in the cache memory is correct per block; and when the host adapter receives a second write request with update data to the write data in the cache memory,
the processor is configured to change the check information of the write data in the cache memory from the first data to second data per block, and then
the host adapter is configured to:
create multiple data blocks by dividing the update data into multiple groups, each having a predetermined length;
add positional information of the update data in the disk unit and check information set as the first data to each data block;
overwrite the write data with the positional information and the check information set as the second data in the cache memory by the update data with the positional information and the check information set as the first data to the cache memory per block; and
check whether the positional information written in the cache memory is correct and whether the check information is set as the first data per block; and
the host adapter is configured to send information about completion of the writing of the write data and the update data to the cache memory from the processor to the host computer.

3. The storage device according to claim 1, wherein the host adapter is configured to send to the host computer information about completion of the writing of the new data to the first memory, the information being from the processor, if the positional information written in the cache memory is correct and the check information is set as the first data.

4. The storage device according to claim 1, wherein:
the host adapter is configured to create multiple data blocks by dividing the update data into multiple groups, each having a predetermined length, and to add positional information of the update data in the disk unit and check information set as the first data to each data block.

5. The storage device according to claim 1, wherein:
the processor is configured to check whether the positional information of the update data written in the cache memory is correct by comparing the positional information written in the cache memory with setting information indicating a position of the disk unit to which the update data should be written.

6. The storage device according to claim 5, wherein:
the host adapter is configured to add a data error detection code for detecting data errors to the write data and the update data; and
the processor is configured to compare information obtained by computing (i) the write data written to the cache memory with (ii) the data error detection code; and (i) and (ii) match, the processor is configured to determine that the update data has been successfully written to the cache memory.

7. The storage device according to claim 1, further comprising:
another cache memory in which data obtained by copying the data stored in the cache memory are stored;
a copy producing unit configured to produce a copy of data transferred from the host adapter to the cache memory; and
another processor configured to control writing of data to the another cache memory;
wherein:
the copy producing unit is configured to produce a copy of the update data (a second update data); and the another processor is configured to write the second update data to the another cache memory, thereby realizing mirroring.

8. The storage device according to claim 7, wherein the another processor is further configured to change the check information of a copy of the write data (a second write data) in the another cache memory from the first data to the second data; and the processor, when writing of the second update data to the another cache memory is completed, is configured to change the check information from the first data to the second data.

9. The storage device according to claim 8, wherein:

the processor is configured to request the another processor to check if the positional information of the second write data to be updated is identical to the positional information of the first write data stored in the cache memory, and to check if the check information of the second write data is set as the first data, the another processor is configured to return a check result to the processor, and the host adapter, if the check result indicates OK, is configured to initiate transfer of the second update data to the another cache memory.

10. The storage device according to claim 9, wherein the processor is further configured to manage a status of the check request until it receives the check result from the another processor.

11. A method for controlling a storage device comprising:

when a host adapter receives a first write request with write data from a host computer, the write data not being written in a cache memory, adding, using the host adapter, positional information of the write data in a disk unit and check information set as first data to the write data;

writing, using the host adapter, the write data with the positional information and the check information to the cache memory; and checking, using the host adapter, whether the positional information written in the cache memory is correct; and when the host adapter receives a second write request with update data to the write data in the cache memory;

changing, using the host adapter, the check information of the write data in the cache memory from the first data to second data; then adding, using the host adapter, positional information of the update data in the disk unit, which position information is the same as the positional information of the write data, and check information set as the first data to the update data;

overwriting, using at least one computer, the write data with the positional information and the check information set as the second data in the cache memory by the update data with the positional information and the check information set as the first data to the cache memory; and checking, using the host adapter, whether the positional information written in the cache memory is correct and whether the check information is set as the first data.

* * * * *